United States Patent
Marunaka

(10) Patent No.: US 6,776,552 B2
(45) Date of Patent: Aug. 17, 2004

(54) BALL JOINT WITH SPHERICAL ROLLERS

(75) Inventor: Hiroshi Marunaka, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/133,529

(22) Filed: Apr. 26, 2002

(65) Prior Publication Data

US 2003/0202841 A1 Oct. 30, 2003

(51) Int. Cl.[7] ............................................. F16C 11/00
(52) U.S. Cl. ..................... 403/124; 403/114; 403/131; 403/122; 403/125; 403/126; 384/558
(58) Field of Search ........................... 403/56, 122, 124, 403/125, 126, 127, 320, 26, 70, 71, 114; 384/558

(56) References Cited

U.S. PATENT DOCUMENTS

| | | | |
|---|---|---|---|
| 1,928,114 A | * 9/1933 | Scheffler | 384/558 |
| 2,350,482 A | 6/1944 | Venditty | |
| 2,494,739 A | 1/1950 | Booth | |
| 2,853,326 A | 9/1958 | Booth | |
| 2,873,130 A | 2/1959 | Moskovitz | |
| 2,913,268 A | 11/1959 | Booth | |
| 3,175,845 A | * 3/1965 | McClive | 403/127 |
| 3,581,361 A | 6/1971 | Loubier | |
| 3,683,421 A | 8/1972 | Martinie | |
| 3,723,995 A | 4/1973 | Baumann | |
| 3,986,754 A | * 10/1976 | Torrant | 384/504 |
| 4,120,597 A | * 10/1978 | Millard | 403/320 |
| 4,666,329 A | 5/1987 | Hugelmann | |
| 4,690,581 A | 9/1987 | Umemoto et al. | |
| 4,842,605 A | 6/1989 | Sonnerat et al. | |
| 4,978,235 A | 12/1990 | Jacob | |
| 5,002,406 A | * 3/1991 | Morton et al. | 384/558 |
| 5,092,898 A | 3/1992 | Bekki et al. | |
| 5,725,597 A | 3/1998 | Hwang | |
| 5,931,597 A | 8/1999 | Urbach | |
| 5,989,294 A | 11/1999 | Marlow | |
| 6,315,486 B1 | 11/2001 | Lunz | |
| 6,328,764 B1 | 12/2001 | Mady | |

FOREIGN PATENT DOCUMENTS

| | | |
|---|---|---|
| DE | 291211 | 2/1927 |
| DE | 2240996 | 6/1973 |
| DE | 2707352 | 8/1978 |
| DE | 3139841 A1 | 4/1983 |
| DE | 4420487 C1 | 6/1995 |
| FR | 1565082 | 4/1969 |
| FR | 0524857 | 1/1995 |
| GB | 356095 | 9/1931 |
| GB | 1169433 | 11/1969 |
| GB | 1363101 | 8/1974 |

* cited by examiner

Primary Examiner—Daniel P. Stodola
Assistant Examiner—Victor MacArthur
(74) Attorney, Agent, or Firm—Polster, Lieder, Woodruff & Lucchesi, L.C.

(57) ABSTRACT

A ball joint which uses spherical rollers to reduce the torque friction which tends to inhibit the rotation of the ball within a ball joint assembly. Two sets of spherical rollers are captivated between the ball and two liner rings in the ball joint housing. The ball has two annular raceways which act as the inner raceways for the spherical rollers. Two liner rings have internal diameters which match the configuration of the spherical rollers and which act as outer raceways for the spherical rollers. The two liner rings have external threads and are installed into the housing which has matching internal threads.

10 Claims, 2 Drawing Sheets

BALL JOINT WITH SPHERICAL ROLLERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates in general to a ball joint and, more particularly, to a ball joint incorporating spherical roller elements.

2. Description of Related Art

Ball joints are used in applications where longitudinal displacement must be minimized, but where angular displacement must be tolerated. As such, the ball joint must be capable of sustaining longitudinal loads which are normally placed on the ball joint during operation. While there are many applications for ball joints, perhaps the most extensive use of ball joints is within the suspension and steering systems of automobiles.

When used in an automotive application, the ball joint consists of four primary components: the ball, the pin, the lining, and the housing. The ball and pin are usually integral, with the ball being captivated by the lining which is encapsulated within the housing. When there is angular displacement of the pin, the lining allows the ball to move within the housing to allow the pin to move to its new angular position. When longitudinal thrust is place on the pin, the thrust is transferred through the pin and into the ball where the load is then transferred to the housing by the lining.

While such ball joint designs provide the ability to allow the ball to swivel within the housing, such designs normally present high frictional torque when the ball and pin are rotated axially. This high frictional torque not only increases the effort needed to rotate the ball within the ball joint housing, but also contributes to the wear of the ball joint.

SUMMARY OF THE INVENTION

The present invention overcomes these and other problems by providing a ball joint which reduces the friction torque and thereby reduces wear to the ball joint. More specifically, the present invention resides in a ball joint which incorporates spherical rollers to reduce the rotational friction torque in the ball joint and to assist in the transfer the loads on the ball and pin of the ball joint to the ball joint housing.

In the present invention, the ball of the ball joint has at least one raceway on the exterior surface of the ball. Rolling elements in the form of spherical rollers travel upon the raceway on the ball. The liner rings of the ball joint are arcuate shaped to allow the spherical rolling elements to roll upon the surface of the liner rings. Thus, when assembled, the spherical rollers are located between the raceway of the ball and the arcuate surface of the liner rings and transfer the load placed on the ball to the housing while allowing the ball to rotate within the lining with reduced frictional torque.

Other objects and features of the present invention will be in part apparent and in part pointed out out hereinafter.

DESCRIPTION OF THE DRAWINGS

Corresponding reference characters indicate corresponding parts throughout the several views of the drawings.

DETAILED DESCRIPTION OF THE INVENTION

Figure 1:
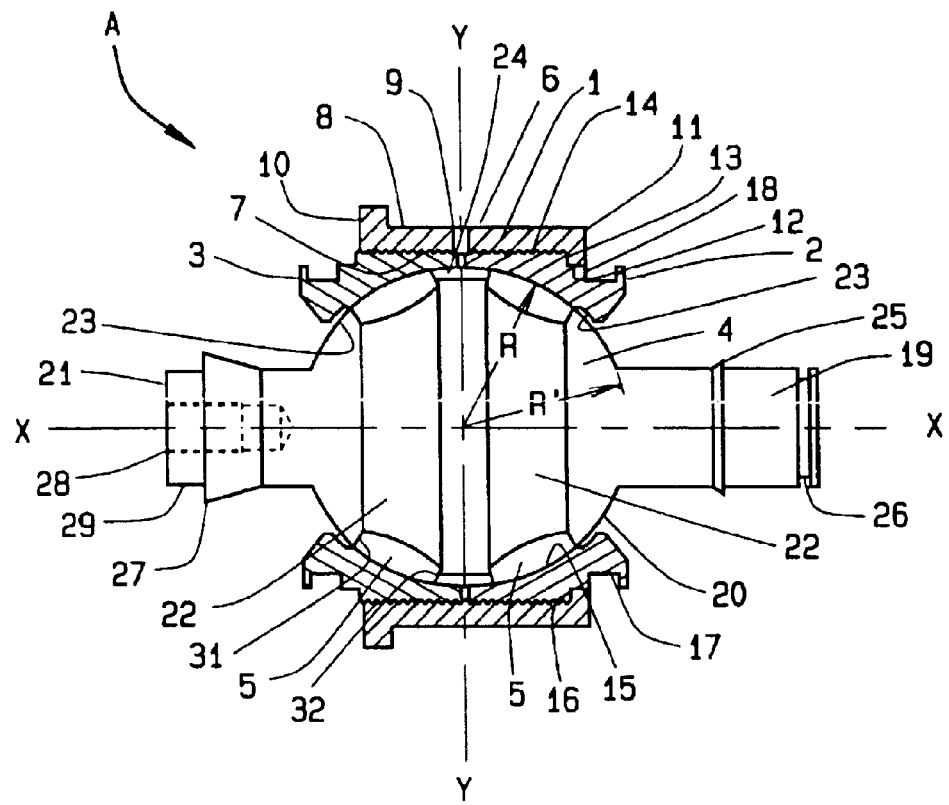
FIG. 1 is a sectional view of the ball joint with spherical roller bearings.

Referring now to the drawings, FIG. 1, an embodiment of a ball joint A is shown. The ball joint A includes a housing 1, a first liner ring 2, a second liner ring 3, a ball and pin element 4, and two sets of spherical rollers 5, with each set forming a separate row.

Figure 4:
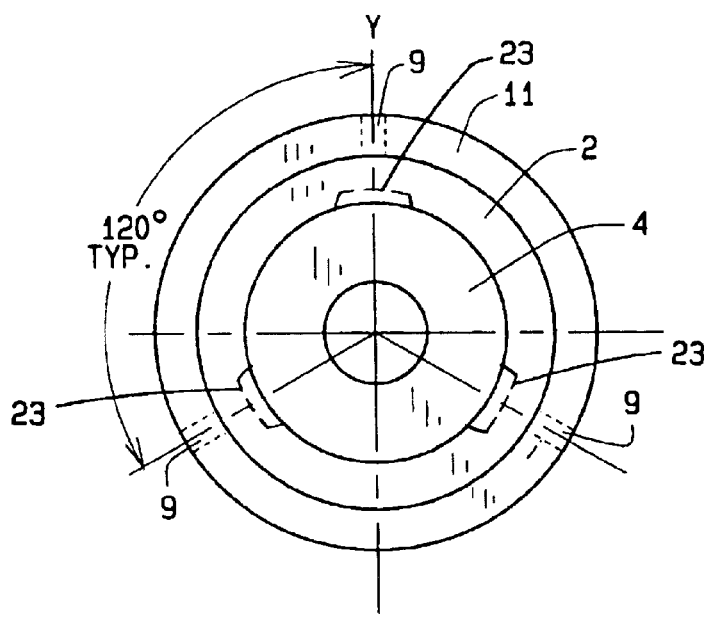
FIG. 4 is an end view of one embodiment of the current invention.

The housing 1 is cylindrical in shape, having a longitudinal axis X and a transverse axis Y. The housing 1 also has a front face 10, a rear face 11, an outside diameter 6, and an inside diameter 7, with the inside diameter having internal threads 8. Three holes 9 are located in the housing 1 and are perpendicular to the outside diameter 6. The three holes 9 are used to allow lubrication of the internal components of the ball joint A. The rear face 11 includes a flange 12 which projects inwardly from the outside diameter 6, the flange 12 having a shoulder 13. FIG. 4 shows the radial location of each of the three holes 9.

The first liner ring 2 has a set of exterior threads 14 which match the internal threads 8 of the housing 1. The first liner ring 2 also has an arcuate interior surface 15 that lies within a spherical envelope having a radius R. An offset 16 is located at distal end of the first liner ring 2, the offset being sized to match the dimensions of the shoulder 13 of the housing 1. An annular groove 17 is located at the distal end of the first liner ring 2 and is dimensioned such that the radial surface 18 of the annular groove is in alignment with the rear face 11 of the housing 1 when the first liner ring 2 is installed in the housing 1. The annular groove 17 provides a seat for a sealing device, such as a boot seal, to protect the ball joint A. The distal end of the first liner ring 2 also has three axial grooves 23. The three axial grooves 23 have a radial length of about 8 degrees and are radially located such that the center of each groove is spaced at 120 degree intervals around the axis X. The axial grooves provide a path for lubrication during change of lubricants in the ball joint A. FIG. 4 shows the radial location of each of the three axial grooves 23.

The second liner ring 3 is exactly like the first liner ring 2 with the exception that the second liner ring 3 does not have an offset 16. Instead, the external threads 14 are continuous on the outside of the second liner ring 3. Similar to the first liner ring 2, the second liner ring 3 also has three axial grooves 23. The three axial grooves 23 of the second liner ring 3 also have a radial length of about 8 degrees and are radially located such that the center of each groove is spaced at 120 degrees intervals around the axis X. The axial grooves provide a path for lubrication during change of lubricants in the ball joint A.

Figure 2:
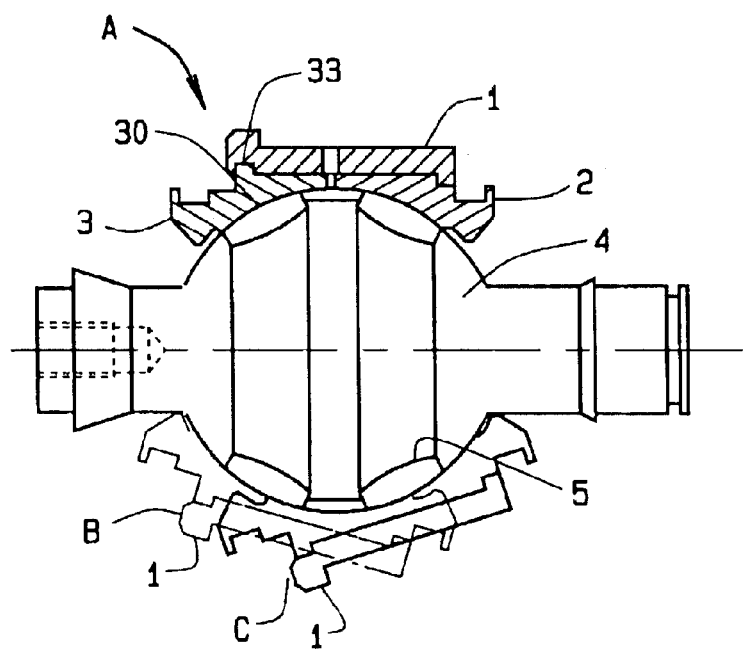
FIG. 2 is a sectional view showing the ability of the present invention to sustain angular displacement of the pin.

In a second embodiment of the present invention as shown in FIG. 2, the second liner ring 3 also has a shoulder 33 which projects outwardly from the X axis. The shoulder 33 is used when the second liner ring 3 is retained within the housing 1 by means of a rolled formed bead 30. The roll formed bead 30 is created when the assembled components of the ball joint A are placed within a device which deforms a portion of the housing 1 to create the roll formed bead 30.

The roll bead 30 is continuous around the full circumference of the housing 1 and the second liner ring 3.

In the current embodiment, the first liner ring and the second liner ring are made of a material which reduces the friction between the liner rings 2 and 3 and the ball and pin element 4. In other embodiments, the material of liner rings 2 and 3 may be of the same or similar material as the housing 1.

The ball and pin element 4 has a first pin 19, a ball 20, and a second pin 21. In the current embodiment, the first pin 19, the ball 20, and the second pin 21 are integrated into a single ball and pin element 4. It will be appreciated, however, that in other embodiments, these three parts may be separate or in any combination of integrated or connected parts.

Figure 3:
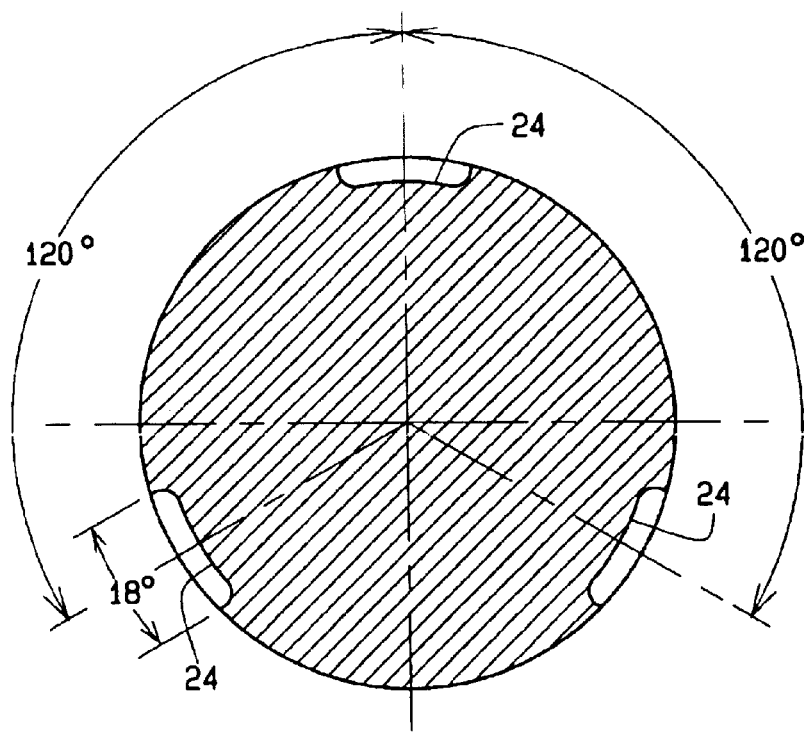
FIG. 3 is a section view of the ball portion of the current invention.

The ball 20 is spherical and has a radius of R'. The radius R' is slightly smaller than the radius R of the first liner ring 2 and the second liner ring 3. More specifically, R' should be from about 0.002 to about 0.006 inches smaller than the diameter R. Alternatively, the radius R' should be smaller than the radius R by an amount equal to about the elastic deformation range of the spherical rollers 5. This difference in radii allows the spherical rollers to carry the loads under the designed loading conditions and also act to save the spherical rollers from catastrophic failure in the event of excessively high loads. Additionally, in another embodiment of the present invention, this difference in radii can eliminate the need for the axial grooves on the liner rings 2 and 3, and on the ball 20. The center of the ball 20 is in alignment with the Y axis of the housing 1. The ball 20 has two oppositely inclined annular raceways 22. The two annular raceways 22 are located longitudinally equidistant from the Y axis and have a cross sectional curvature conforming to the size and shape of the spherical rollers 5. Each of the two annular raceways 22 lie between a first rib 31 and a second rib 32 which act to guide the spherical rollers 5 with the track of the raceways 22. The ball 20 also has three axial grooves 24 which are located around the Y axis of the ball 20, at equal circumferential intervals. The three axial grooves 24 have a radial length of about 18 degrees and are radially located such that the center of each groove is 120 degrees from the adjacent grooves and at their ends open through the faces of the ribs 31 and 32. The axial grooves 24 provide a path to supply lubrication to the spherical rollers 5. FIG. 3 shows the radial location of each of the three axial grooves 24.

The first pin 19 and the second pin 21 are configured to allow connection of the pins to other machine components which incorporate the present invention. In the embodiment described herein, the first pin 19 has a circumferential shoulder 25 and a groove 26 whereby the pin 19 can be inserted into an opening of a machine component which can then be held captive by the installation of a snap ring (not shown) into the groove 26. The second pin 21 has a different method of attachment which utilizes a chamfered shoulder 27 and a mounting hole 28. The second pin 21 is installed into another opening of a machine component by inserting the neck 29 of the second pin 21 into the opening and then captivating the machine component by installing a fastener such as a bolt (not shown) into the mounting hole 28. This method of attaching the first pin 19 and the second pin 21 to a machine component are only examples of the type of connections which may be used to attached the present invention to a machine component. For example, the pins may be attached to the machine component by riveting, welding, gluing, shrink-fitting, interference fitting, or by use of other retaining mechanisms such as locknuts, jam nuts, and clamping devices. It is understood that the attachment method may be modified as needed for each application without going beyond the scope of the present invention.

The spherical rollers 5 are configured to match the two oppositely inclined annular raceways 22 of the ball 20, as well as the radius R of the first liner ring 2 and the second liner ring 3 such that the outwardly presented faces of the spherical rollers 5 lie within a spherical envelope that is slightly larger than diameter than diameter of the surface of the ball 20. When assembled, the spherical rollers 5 are positioned between, and travel upon, the two annular raceways 22 of the ball 21, and the arcuate interior surfaces 15 of the first liner ring 2 and the second liner ring 3. Thus, the arcuate interior surfaces 15 of the first liner ring 2 and the second liner ring 3 act as the outer raceways for the spherical rollers 5. The spherical rollers may be separated and held into position on the annular raceways 22 of the ball 21 by a cage (not shown).

To assemble the ball joint A, the first liner ring 2 is installed into the housing 1 by screwing the first liner ring 2 into the housing 1. The first liner ring 2 is installed into the housing 1 until the shoulder 13 comes into contact with the flange 12 of the housing 1. A first set of spherical rollers 5 is placed onto the annular raceway 22 of the ball 21, and the ball and pin element 4 is then inserted through the inner opening of the first liner ring 2 until the spherical rollers 5 contact the arcuate inside surface 15 of the first liner ring 1. A second set of spherical rollers 5 is placed on the second annular raceway 22 and the second liner ring 3 is then installed into the housing 1 by screwing the second liner ring 2 into the housing 1 until the inside arcuate surface 15 of the second liner ring 3 contacts the spherical rollers 5. While the current embodiment utilizes liner rings, these rings may be omitted from other embodiments such that the ball 20 of the ball and pin element 4 are in direct contact with the interior surface of the housing which is configured to be an arcuate surface having the radius R. Once assembled, the ball joint A can then be connected with other machine components by attaching the first pin 19, the second pin 21, and the housing 1 to the machine components wherein the ball joint A is to be used.

It must be noted that the description of the current embodiment show the use of threads in the housing 1, the first liner ring 2, and the second liner ring 3. However, the present invention is not isolated to embodiments which only use threads to engage these three elements, In fact, there are a number of other types of interconnecting methods which can be used and still stay within the scope of the present invention. For example, as shown in FIG. 2, the internal components can be retained within the housing 1 by inserting those components into the housing and then rolling over or otherwise deforming a portion of the front face 10 of the housing 1 such that a roll bead 30 is generated which covers a portion of the second liner ring 3, thus holding the second retainer ring 3 and the other internal components within the housing 1. Other forms of retention such as retaining rings, end plates with fasteners, welding, bonding, and wedging, or a combination of these methods, may also be used to retain the first liner ring 2 or the second liner ring 3 to the housing 1, thereby retaining the internal components of the ball joint within the housing.

When assembled, ball joint A allows for the ball and pin element 4 in FIG. 2 to rotate axially and to allow angular displacement of the ball and pin element 4 within the ball joint A. The lower portion of FIG. 2 illustrates this type of angular displacement by indicating the two positions B and C of the housing 1 in relation to the ball and joint element 4.

While the above description describes various embodiments of the present invention, it will be clear that the present invention may be otherwise easily adapted to create other embodiments to fit any configuration where a ball joint with reduced frictional torque may be utilized. As such, the present invention, the embodiments described herein, and other embodiments which may be suggested by the present disclosure are useful where ball joints having reduced frictional torque are indicated.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A ball joint, comprising:
   a housing, the housing being cylindrical in shape and having a longitudinal axis X, a transverse axis Y, an outside diameter, an inside diameter, and a rear face, wherein the rear face includes a flange having a shoulder which projects inwardly from the outside diameter toward the longitudinal axis X, and wherein the housing has three holes which are perpendicular to the outside diameter and located on the transverse Y axis of the housing at 120 degree intervals around the circumference of the outside diameter;
   a least one liner ring wherein the at least one liner ring has an offset at a distal end, the offset being sized to match the dimensions of the shoulder of the housing, wherein the at least one liner ring has an arcuate interior surface that lies within a spherical envelope having a radius R, and wherein the at least one liner ring has an annular groove located at the distal end, the annular groove having a radial surface and being sized such that the radial surface is in alignment with the rear face of the housing when the at least one liner ring is installed into the housing, and wherein the at least one liner ring has an annular groove located at a proximal end of the at least one liner ring;
   a ball and pin element comprising a ball having a radius R' that is slightly smaller than the radius R, and wherein the ball and pin element includes has a first pin and a second pin, and wherein the ball is substantially spherical and has a center axis Y, and wherein the ball has at least one annular raceway located on the circumference of the ball, the annular raceway having a first cross sectional curvature, and wherein the first pin and the second pin include means for connecting the first pin and the second pin to a machine component in which the ball joint is installed; and
   at least one set of spherical rollers wherein all spherical rollers are of the same size and organized into at least one row, wherein the at least one set of spherical rollers are configured to match the radius R and to match the at least one annular raceway of the ball, and wherein the spherical rollers have a second cross sectional curvature matching the first cross sectional curvature of the annular raceway of the ball such that when the spherical rollers are installed onto the ball, the spherical rollers lie within the spherical envelope having the radius R.

2. The ball joint of claim 1 wherein said first liner ring and said second liner ring each include three axial grooves which are radially located such that the center of each groove is spaced at 120 degree intervals around the longitudinal axis X of the housing.

3. The ball joint of claim 2 wherein said ball has three axial grooves which are radially located on the circumference of the ball and on the center axis Y of the ball such that the center of each axial groove is 120 degrees from the adjacent axial groove.

4. The ball joint of claim 3 further comprising retaining means for retaining the first liner ring, the second liner ring, the ball and joint element, and the spherical rollers within the housing.

5. The ball joint of claim 4 wherein said ball has two oppositely inclined annular raceways located on the circumference of the ball and equidistant from the center axis Y of the ball, said two annular raceways each having a cross sectional curvature matching the spherical rollers such that when the spherical rollers are installed onto the ball, the spherical rollers lie within the spherical envelope having said radius R.

6. The ball joint of claim 5 wherein said retaining means includes internal threads on the inside diameter of the housing and external threads on the first liner ring and the second liner ring which match said internal threads of the housing.

7. The ball joint of claim 5 wherein said retaining means includes a roll bead on the front face of the housing, said roll bead being generated by deforming a portion of the end face of the housing such as to make the roll bead continuous around the end face of the housing, and such that the roll bead acts to retain the second liner ring thin the housing.

8. A ball joint comprising:
   a housing, said housing being cylindrical in shape and having a longitudinal axis X, a transverse axis Y, an outside diameter, an inside diameter, and a rear face, wherein said housing has three holes which are perpendicular to the outside diameter, and wherein said rear face includes a flange having a shoulder which projects inwardly from the outside diameter toward the longitudinal axis X;
   a first liner ring, said first liner ring having a first arcuate interior surface having a radius R, said first liner ring also having an offset at a distal end of the first liner ring, said offset being sized to match the dimensions of the shoulder of the housing, said first liner ring also having an annular groove located at the distal end of the first liner ring, said annular groove having a radial surface and being sized such that the radial surface is in alignment with the rear face of the housing when the first liner ring is installed into the housing, and wherein the first liner ring also includes three axial grooves which are radially located such that the center of each axial groove is spaced at 120 degrees intervals around the longitudinal axis X of the housing;
   a second liner ring said second liner ring having a second arcuate interior surface having a radius R, said second liner ring also having an annular groove located at a proximate end of the second liner ring, and wherein the second liner ring also includes three axial grooves which are radially located such that the center of each axial groove is spaced at 120 degrees intervals around the longitudinal axis X of the housing;
   a ball and pin element said ball and pin element having a first pin, a second pin, and a ball, said ball being substantially spherical and having a center axis Y wherein said ball has a radius R' which is slightly smaller than the radius R of the first liner ring and the second liner ring and having a cross sectional curvature, said ball having at least one annular raceway located on the circumference of the ball, said annular raceway having a cross sectional curvature matching the spherical rollers such that when the spherical rollers are installed onto the ball, the spherical rollers lie within the spherical envelope having said radius R, the said first pin and second pin having means for connecting the first pin and the second pin to a machine component in which the ball joint is installed, wherein said ball has three axial grooves which are radially located on the circumference of the ball and on the center axis Y of the ball such that the center of each axial groove is 120 degrees from the adjacent axial groove;

spherical rollers, said spherical rollers being configured to match the radius R of the first liner ring and the second liner ring, and to match the annular raceway of the ball, and wherein all spherical rollers are the same size; and retaining means for retaining the first liner ring, the second liner ring, the ball and joint element, and the spherical rollers within the housing.

9. The ball joint of claim 8 wherein said retaining means includes internal threads on the inside diameter of the housing and external threads on the first liner ring and the second liner ring which match said internal threads of the housing.

10. The ball joint of claim 9 wherein said retaining means includes a roll bead on the front face of the housing, said roll bead being generated by deforming a portion of the end face of the housing such as to make the roll bead continuous around the end face of the housing, and such that the roll bead acts to retain the second liner ring within the housing.

* * * * *

UNITED STATES PATENT AND TRADEMARK OFFICE
CERTIFICATE OF CORRECTION

PATENT NO.   : 6,776,552 B2  
DATED        : August 17, 2004  
INVENTOR(S)  : Hiroshi Marunaka Page 1 of 1

It is certified that error appears in the above-identified patent and that said Letters Patent is hereby corrected as shown below:

<u>Column 6,</u>
Line 28, replace "thin" with -- within --

Signed and Sealed this

Fourth Day of January, 2005

JON W. DUDAS
*Director of the United States Patent and Trademark Office*